(12) United States Patent
Shaffer

(10) Patent No.: US 6,481,722 B1
(45) Date of Patent: Nov. 19, 2002

(54) GASKET FOR PRESSURIZED FLUID SYSTEM

(75) Inventor: Ronald J. Shaffer, Pittsburgh, PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/512,538

(22) Filed: Feb. 24, 2000

(51) Int. Cl.[7] ................................................. F16J 15/10
(52) U.S. Cl. ....................................... 277/609; 277/626
(58) Field of Search .................................. 277/591, 608, 277/609, 612, 616, 626; D23/269; D15/5

(56) References Cited

U.S. PATENT DOCUMENTS

| | | | | |
|---|---|---|---|---|
| 222,388 A | * | 12/1879 | Doty | |
| 1,171,295 A | * | 2/1916 | Young | |
| 3,480,301 A | * | 11/1969 | Kroening | |
| 4,758,028 A | * | 7/1988 | Davies et al. | |
| 5,362,115 A | * | 11/1994 | Carr | |
| 5,472,214 A | * | 12/1995 | Wainer et al. | |
| 5,531,454 A | * | 7/1996 | Borneby | |
| 5,611,549 A | * | 3/1997 | Forry | |

* cited by examiner

Primary Examiner—Anthony Knight
Assistant Examiner—John L. Beres
(74) Attorney, Agent, or Firm—James Ray & Associates

(57) ABSTRACT

Gasket for sealing between flanges in a pressurized fluid system. A central opening is disposed within an inner periphery of the gasket, the inner periphery being curved toward the central opening. Fluid pressure on the inner periphery is reacted by hoop tension in the gasket. The outer periphery of the gasket has concave segments between fastener holes so the area of the gasket is substantially less than the area of the flanges. In this manner, the clamping pressure exerted by the flanges on the gasket is increased.

15 Claims, 8 Drawing Sheets

GASKET FOR PRESSURIZED FLUID SYSTEM

FIELD OF THE INVENTION

The present invention relates, in general, to fluid sealing means for pressurized fluid systems and, more particularly, to gaskets for locomotive air compressors.

BACKGROUND OF THE INVENTION

The compressors employed in airbrake systems used in locomotives generally have air pressure connections having rectangular flanges with gaskets clamped therebetween. A prior art flange and gasket as employed in a locomotive air compressor is shown in FIG. 1. The flange 10 includes a port 11 for fluid communication with an air conduit (not shown). Flange 10 has a plurality of holes 14 to accommodate bolts for attaching flange 10 to a similar flange (not shown) which receives the compressed air. The prior art gasket 12 is compressed between flange 10 and a second flange (not shown) by tension in the bolts to prevent air loss between the flanges. A plurality of holes 15 are provided for the bolts. The air pressure in port 11 presses outward on inner edge 16 of gasket 12. This pressure is sufficient to cause tensile stresses at regions 18 and 20 of gasket 12 and compressive stresses at region 22. These stresses tend to cause failure of gasket 12.

SUMMARY OF THE INVENTION

In one aspect, the present invention is a gasket for a fluid system containing a pressurized fluid. The fluid system includes a first rectangular flange having a first port for communicating the pressurized fluid to a second port in a second rectangular flange. The first flange is attached to the second flange by a predetermined number of fasteners passing through first flange fastener holes in the first flange and through second flange fastener holes in the second flange. The gasket consists of a sheet of deformable material enclosed within an outer periphery. The outer periphery defining outwardly extending portions with concave segments between adjacent pairs of such outwardly extending portions. The gasket has a plurality of gasket fastener holes disposed in the outwardly extending portions. A central opening is disposed within an inner periphery of the gasket. Such inner periphery is curved toward the central opening. The central opening enables passing the pressurized fluid from the first port to the second port. When the gasket is assembled between the first flange and the second flange to seal between the first flange and the second flange and the fluid system contains the pressurized fluid, a pressure of the fluid exerted on the inner periphery of the gasket is at least in part reacted by hoop tension in the gasket.

In another aspect, the present invention is a fluid connection for connecting a first fluid passage in a first pressure containment structure to a second fluid passage in a second pressure containment structure. The fluid connection has a first flange having a first port. The first flange being for attachment to the first pressure containment structure so that the first port is in fluid communication with the first fluid passage. The fluid connection also has a second flange having a second port. The second flange being for attachment to the second pressure containment structure so that the second port is in fluid communication with the second fluid passage. A gasket is disposed between the first flange and the second flange to seal between the first flange and the second flange. A plurality of fasteners compress the gasket between the first flange and the second flange. The gasket has a central opening defined within an inner periphery of the gasket, the inner periphery being curved toward the central opening. The central opening provides fluid communication between the first port and the second port. The gasket has a plurality of outwardly extending portions having gasket fastener holes enclosing the fasteners and it has an outer periphery having concave portions between adjacent pairs of the outwardly extending portions so that an area of the gasket is substantially less than an area of the first flange and is substantially less than an area of the second flange.

In another aspect, the invention is a compressor system for supplying compressed air. It has at least one pressure connection having rectangular flanges and a gasket clamped between the flanges to prevent air loss between the flanges. The gasket has a round central opening and a periphery with concave portions.

OBJECTS OF THE INVENTION

It is therefore one of the primary objects of the present invention to provide a gasket for locomotive air compressors which is less prone to failure than prior art gaskets.

Another object of the present invention is to provide a gasket for locomotive air compressors which resists air pressure by hoop tension in an inner portion of the gasket.

Still another object of the present invention is to provide a gasket for locomotive air compressors which eliminates localized stress concentrations.

Yet another object of the present invention is to provide a gasket for locomotive air compressors which does not rely on friction between the clamping flanges to react the forces due to pressure on the gasket.

A further object of the present invention is to provide an improved combination of flange and gasket for pressurized fluid systems which provides high clamping pressures on the gasket.

It is an additional object of the present invention to provide a gasket for pressurized fluid systems in which stresses in the gasket due to the fluid pressure are minimized.

Still yet another object of the present invention is to provide a gasket for pressurized fluid systems having square flanges in which stresses in the gasket due to the fluid pressure are minimized.

Yet still another object of the present invention is to provide a gasket and flange combination for pressurized fluid systems in which the clamped area of the gasket is minimized to increase clamping pressure.

Yet an additional object of the present invention is to provide a gasket and flange combination for pressurized fluid systems which presents a smooth continuous surface to the fluid to reduce turbulence in the fluid.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
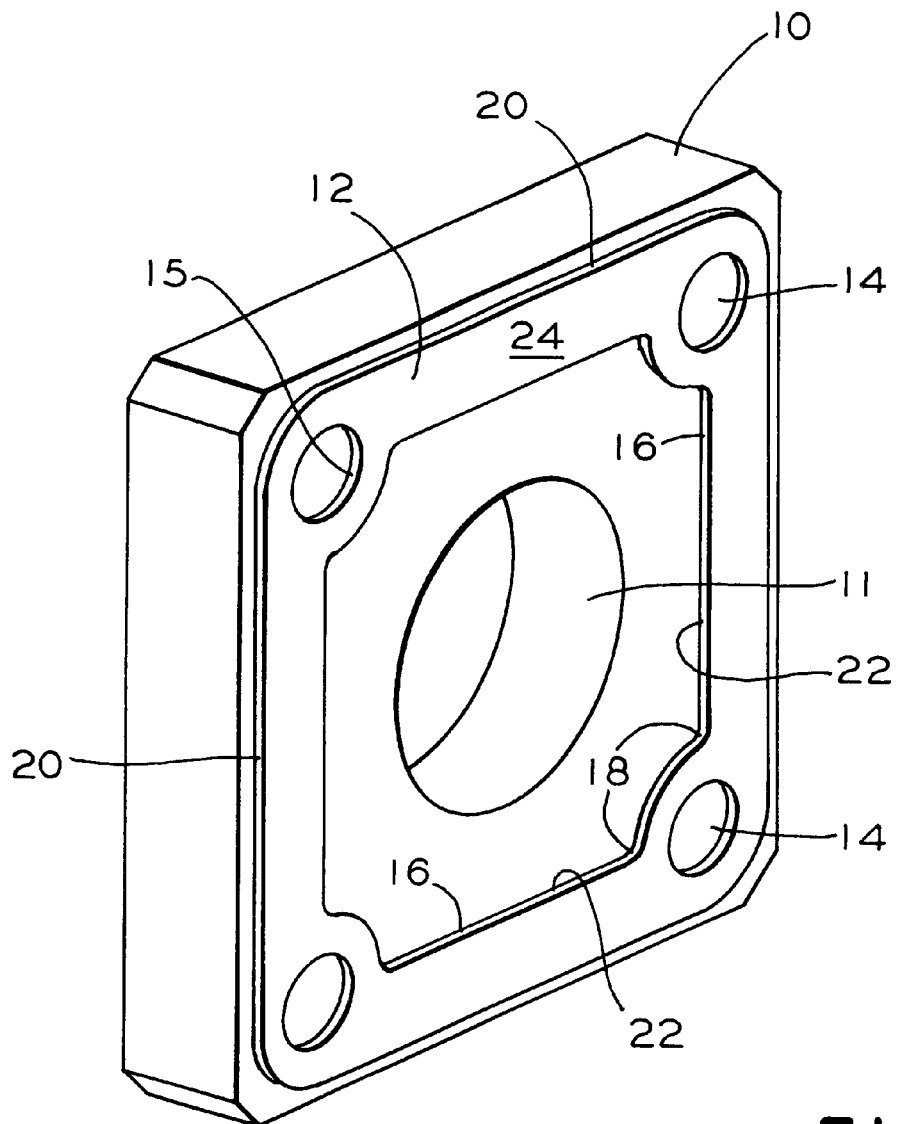
FIG. 1 is a perspective view of a prior art rectangular flange and gasket.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Figure 2:
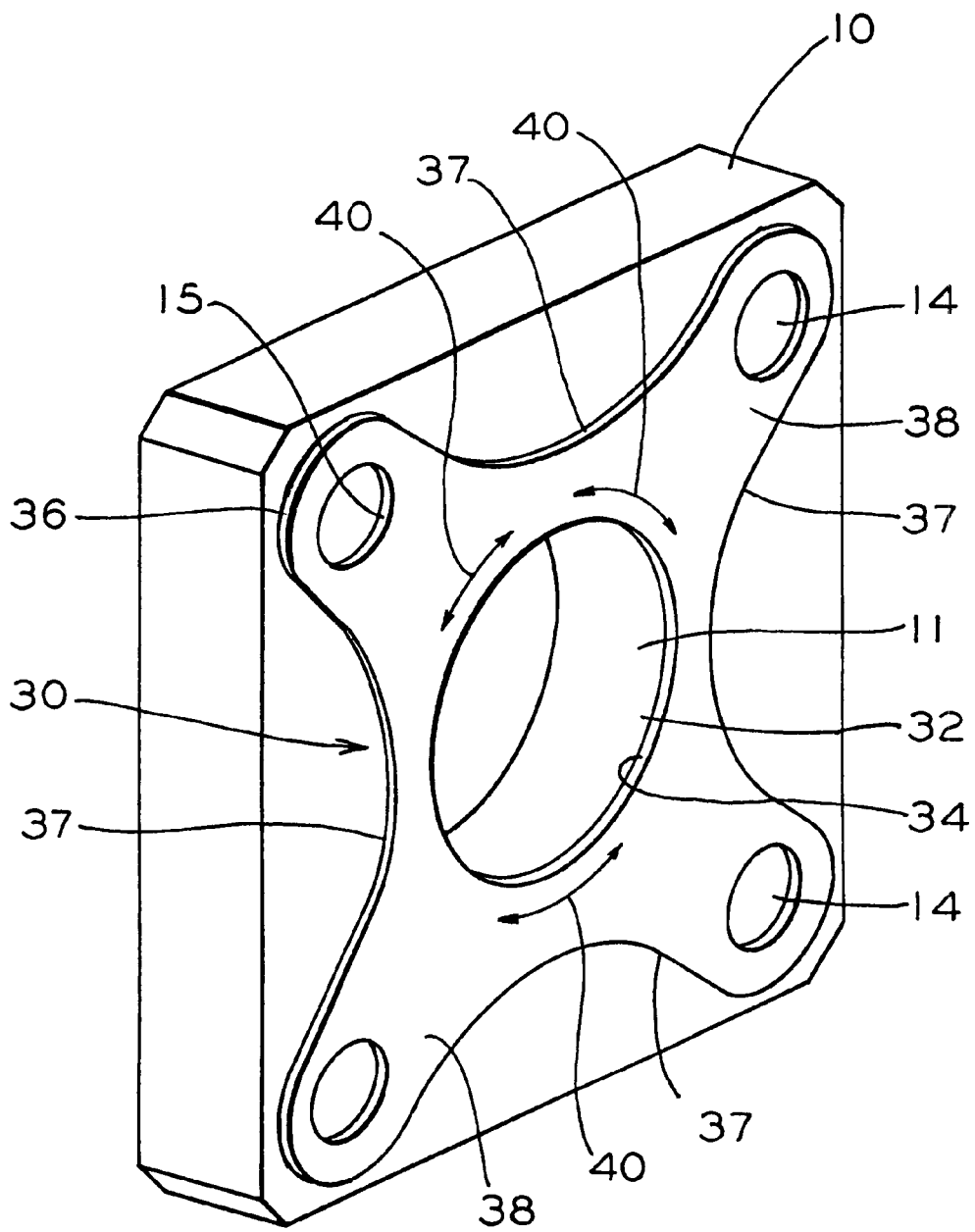
FIG. 2 is a perspective view of a rectangular flange with a presently preferred embodiment of the gasket of the present invention.
Figure 3:
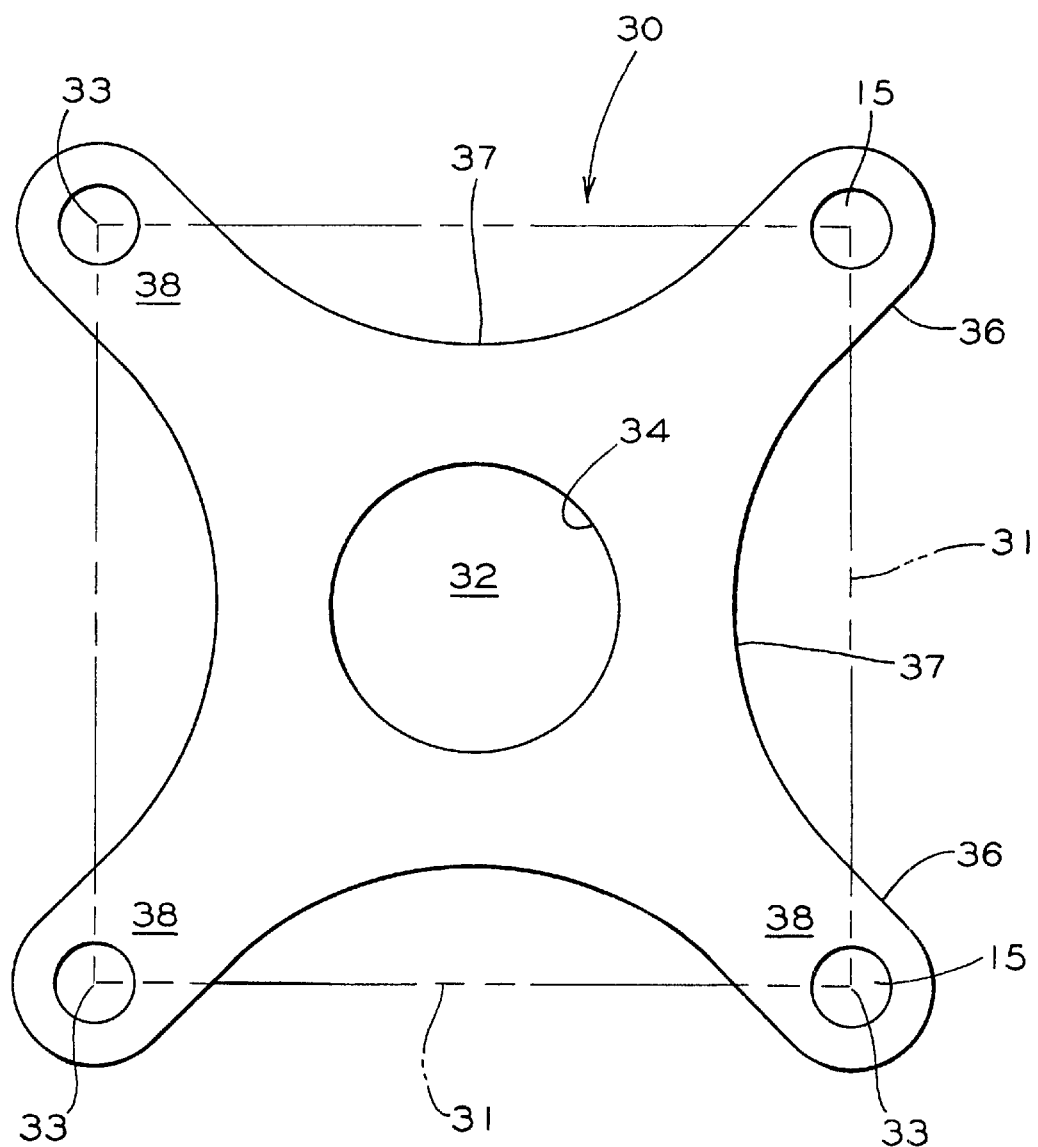
FIG. 3 is a plan view of the gasket of the invention illustrated in FIG. 2.

Attention is now directed to FIGS. 2 and 3 which show a rectangular flange 10 and a gasket, generally designated 30, according to the presently preferred embodiment of the invention. Gasket 30 has an outer periphery 36 which encloses four outwardly extending portions 38 having fastener holes 15. Outer periphery 36 has concave segments 37 between adjacent pairs of the outwardly extending portions 38. Preferably, concave segments 37 are substantially arcuate. These concave segments 37 serve to reduce the area of gasket 30. In the presently preferred embodiment, the fastener holes 15 in gasket 30 are disposed on the corners 33 of a square 31, seen in FIG. 2. Such a gasket is employed for the case in which flange 10 is square.

Figure 12:
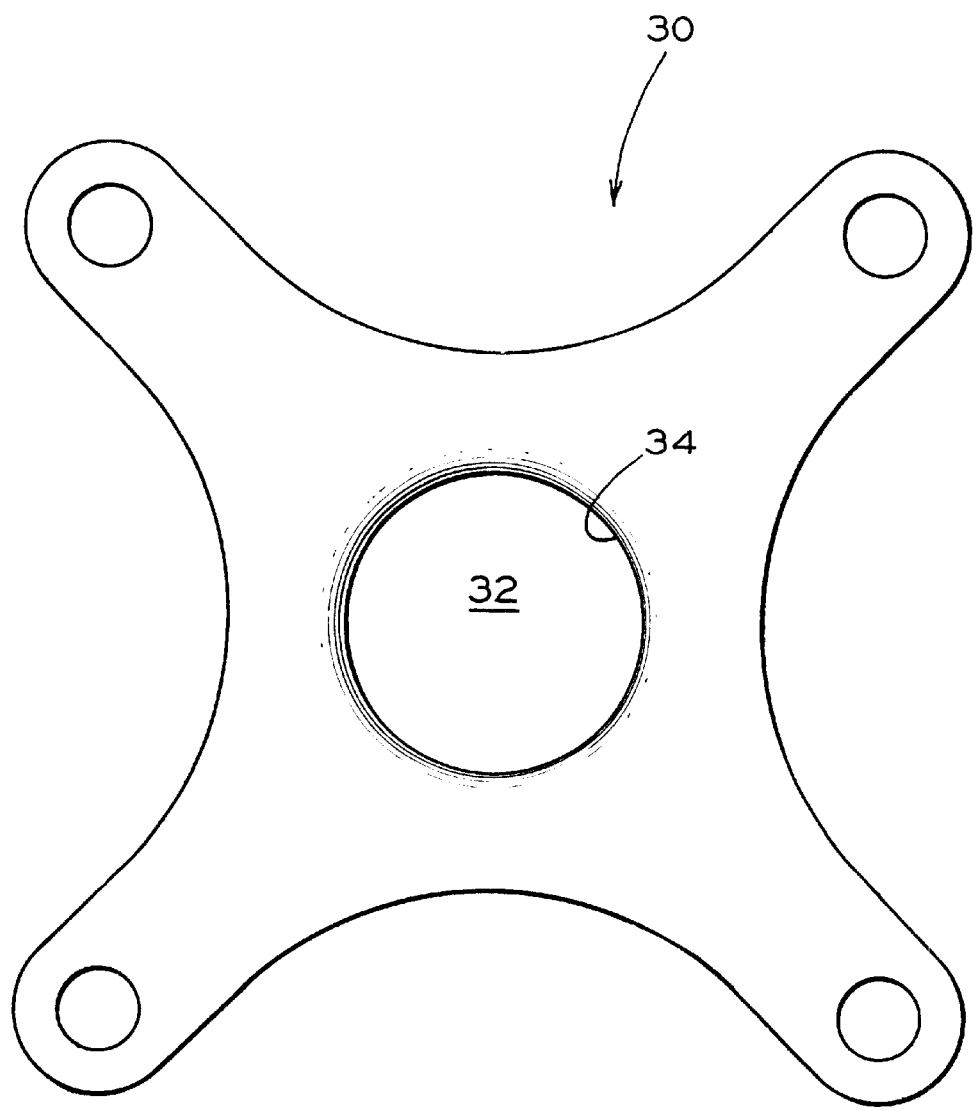
FIG. 12 is a top view of the gasket according to an embodiment of the invention.
Figure 13:
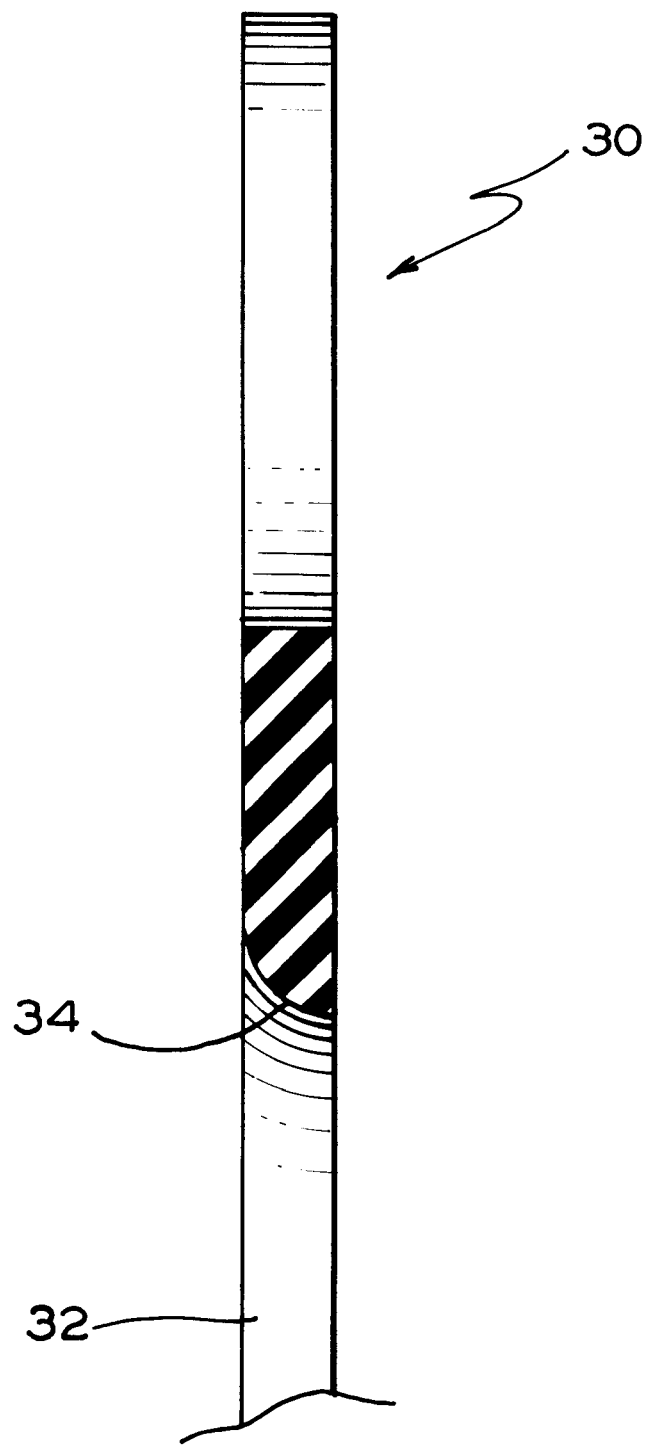
FIG. 13 is a view of a portion of the cross section of the gasket shown in FIG. 12 taken across the lines XIII–XIII.

Gasket 30 has a central opening 32 disposed within an inner periphery 34 of gasket 30. Inner periphery 34 displays a double curvature. Such inner periphery 34 is curved in a first instance around the central opening 32 and in a second instance is curved toward such central opening 32. This is evident in FIGS. 12 and 13. In the presently preferred embodiment shown central opening 32 is circular. A person skilled in the art will recognize that fluid pressure exerted in an outward direction on inner periphery 34 of gasket 30 is, at least in part, reacted by hoop tension along tension lines 40, which is seen in FIG. 2.

Figure 4:
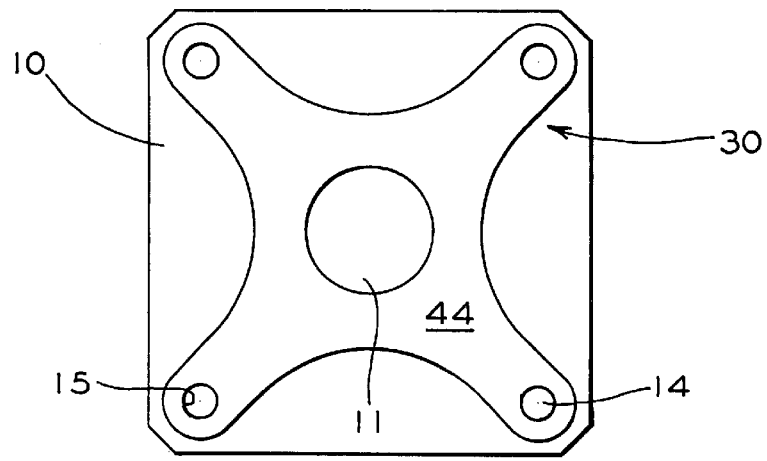
FIG. 4 is a plan view of a rectangular flange and the presently preferred gasket of the invention.
Figure 5:
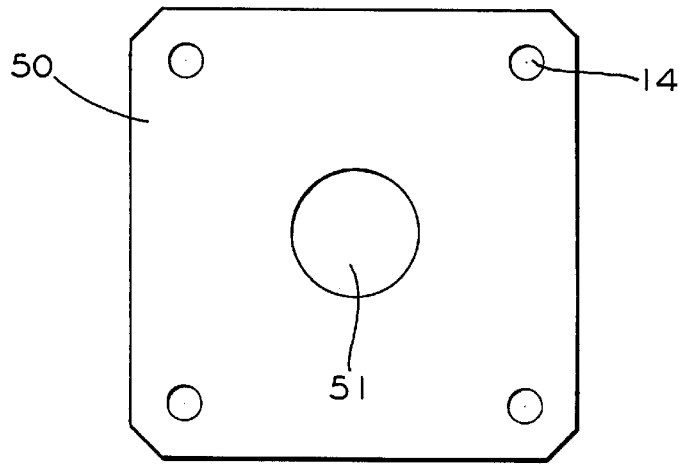
FIG. 5 is a plan view of a rectangular flange for attachment to the flange of FIG. 4.
Figure 6:
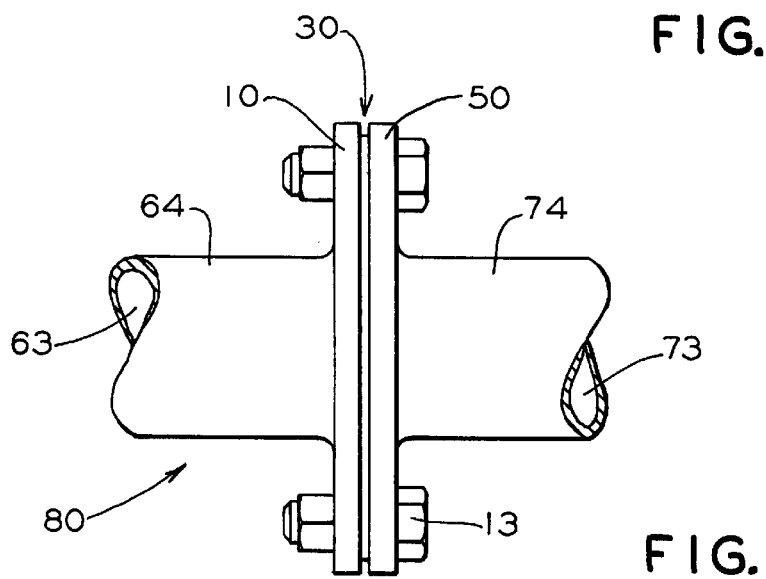
FIG. 6 is a side view of a pressure connection employing the flanges and gasket of FIGS. 4 and 5.

FIGS. 4, 5 and 6 show a fluid pressure connection, generally designated 80, consisting of flange 10 attached to a like flange 50 with gasket 30 disposed therebetween. Fasteners 13, preferably bolts, pass through flange fastener holes 14 and gasket fastener holes 15. Fasteners 13 compress gasket 30 between flange 10 and flange 50.

In use, flange 10 and flange 50 are usually welded to or formed integrally with fluid containment structures. FIG. 6 shows flange 10 welded to first conduit 64 having first passage 63, and it shows flange 50 welded to second conduit 74 having second passage 73. Port 11 in flange 10 communicates with the first passage 63 and port 51 in flange 50 communicates with second passage 73. Preferably, central opening 32 in gasket 30 (FIG. 3) has the same diameter as ports 11 and 51 in flanges 10 and 50, respectively The amount of clamping force available from the fasteners is limited by the size and grade of the fasteners. Therefore, to increase the clamping pressure on gasket 30 (FIG. 3), its area is reduced so as to be substantially less than the areas of flanges 10 and 50. That is the purpose of the concave segments 37 in the outer periphery 36 of gasket 30. Preferably, when a gasket 30, according to the present invention, is used to replace a specific prior art gasket 12 (FIG. 1), the area of gasket 30 should be less than or equal to the area of gasket 12.

Figure 7:
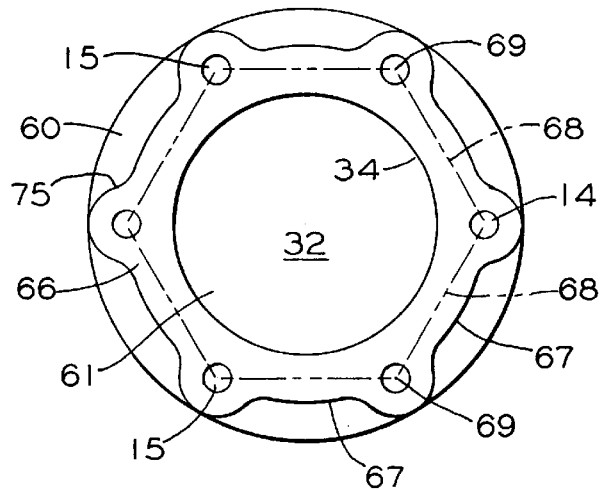
FIG. 7 is a plan view of a gasket and flange combination which accommodates six fasteners.
Figure 8:
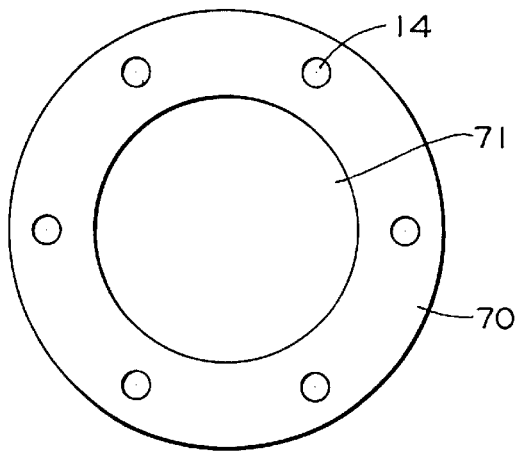
FIG. 8 is a plan view of a flange for attachment to the flange of FIG. 7.
Figure 9:
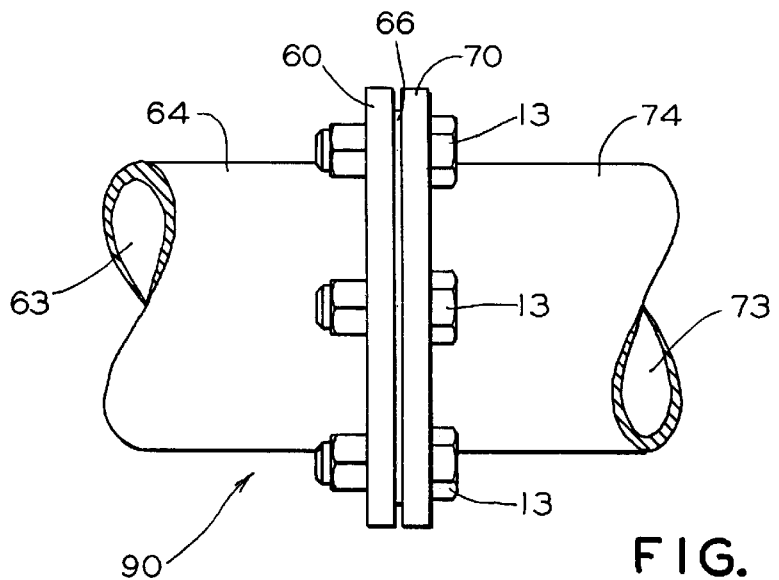
FIG. 9 is a side view of the flange of FIG. 8 attached to the gasket and flange of FIG. 7.

Attention is now directed to FIGS. 7, 8 and 9. FIG. 7 shows a flange 60 having holes 14 for fasteners 13 and a gasket 66 having holes 15 for fasteners 13. Preferably, the fastener holes 14 and 15 are located on corners 69 of a regular polygon 68. In the embodiment shown, polygon 68 is a regular hexagon. Preferably, holes 14 in flange 60 and holes 15 in gasket 66 are round. In FIG. 9, a fluid pressure connection, generally designated 90, is shown, which employs flange 60 and gasket 66 assembled with the flange 70. Typically, flange 60 is attached to the first fluid pressure containment structure 64 so that port 61 in flange 60 communicates with first fluid passage 63. Flange 70 is attached to second fluid pressure containment structure 74 so that port 71 in flange 70 communicates with second fluid passage 73.

To provide a seal between flange 60 and flange 70, gasket 66 is clamped therebetween by bolts 13. To increase the clamping pressure, outer periphery 75 of gasket 66 has concave portions 67. Gasket 66 has an inner periphery 34 enclosing central opening 32. Central opening 32, preferably, is circular. It permits fluid communication between port 61 in flange 60 and port 71 in the flange 70, so that first fluid passage 63 communicates with second fluid passage 73.

Figure 10:
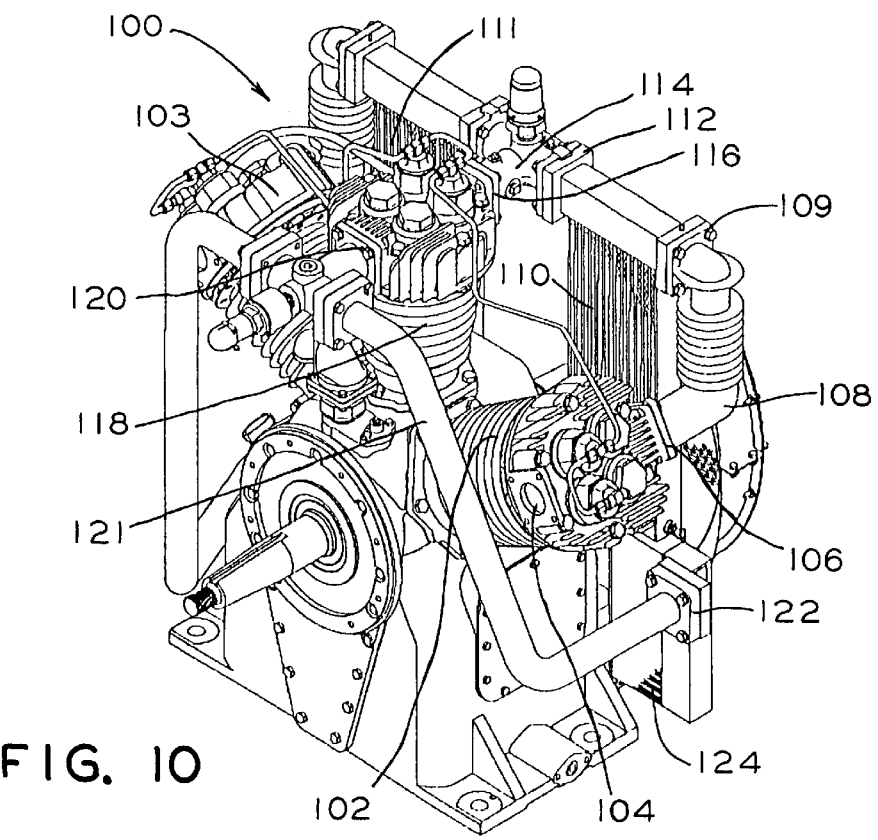
FIG. 10 is an isometric view of a compressor system according to the present invention.

FIG. 10 shows a presently preferred embodiment of the invention, which is a compressor system, generally designated 100. Compressor system 100 has low pressure cylinders 102 and 103. Low pressure cylinder 102 has inlet 104 to which an air filter(not shown) would be attached. Low pressure cylinder 102 has outlet 106 which employs rectangular flanges 10 and 50, and gasket 30 according to the present invention. Air from outlet 106 of low pressure cylinder 102 is received by low pressure conduit 108 which conveys the air to intercooler 110. Inlet 109 of intercooler 110 likewise preferably employs the square flanges 10 and 50 as well as gasket 30, according to the present invention. Outlet 112 of intercooler 110 also preferably employs square flanges 10 and 50 as well as gasket 30, according to the present invention. A T-shaped piping connection 114 receives air from intercooler 110 and a second intercooler 111 which receives air from a second low pressure cylinder 103.

The T-shaped piping connection 114 supplies air to inlet 116 of high pressure cylinder 118. Inlet 116 of the high pressure cylinder 118, preferably, also employs flanges 10 and 50 as well as gasket 30 of the present invention. Outlet 120 of high pressure cylinder 118 also, preferably, employs square flanges 10 and 50 as well as gasket 30, in accordance with the present invention. High pressure conduit 121 conveys air from high pressure cylinder 120 to inlet 122 of aftercooler 124. Inlet 122, preferably, also employs square flanges 10 and 50 as well as gasket 30, according to the present invention.

Figure 11:
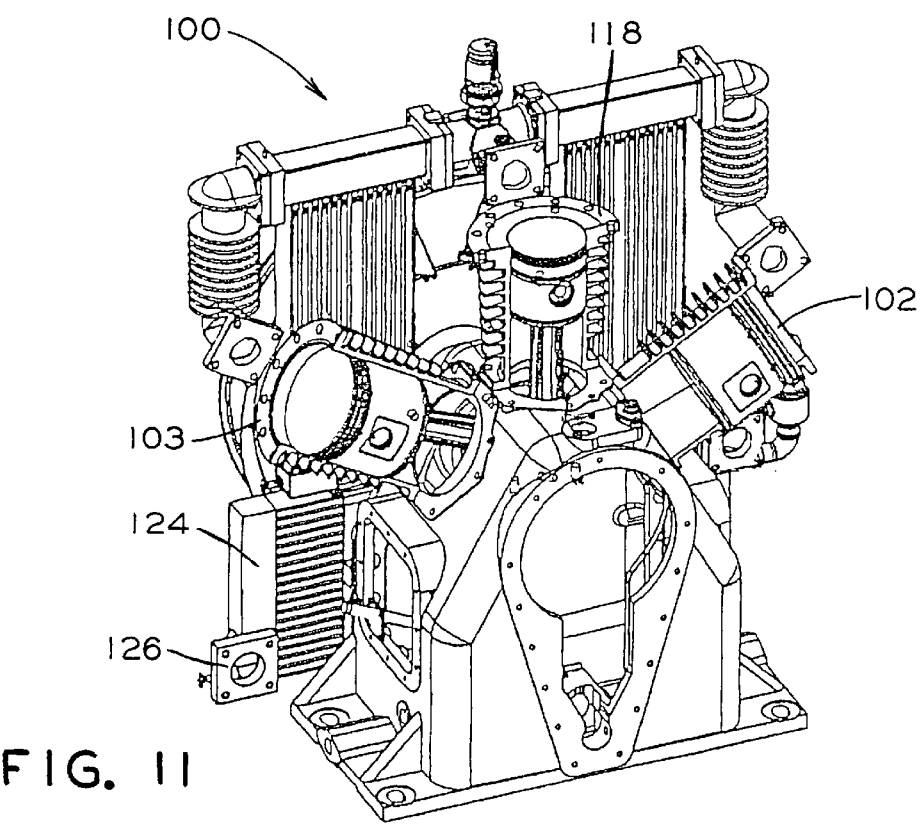
FIG. 11 is a cutaway view of the compressor system shown in FIG. 10 and showing an aftercooler outlet.

FIG. 11 shows a view of compressor system 100 which has some portions cut away to show internals of low pressure cylinders 102 and 103 and the high pressure cylinder 118. This figure also shows an outlet 126 of aftercooler 124. Outlet 126, preferably, also employs square flanges 10 and 50 as well as gasket 30, according to the present invention.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

I claim:

1. A gasket for a fluid system, said gasket comprising
   (a) a sheet of deformable material enclosed within an outer periphery, said outer periphery defining outwardly extending portions having concave segments between adjacent pairs of said outwardly extending portions;
   (b) fastener holes formed through said gasket, said fastener holes disposed in said outwardly extending portions of said gasket; and
   (c) a central opening disposed within an inner periphery of said gasket, said inner periphery of said gasket having a double curvature, in a first instance being curved around said central opening and in a second instance being curved toward said central opening.

2. A gasket, according to claim 1, wherein said concave segments of said outer periphery are substantially arcuate.

3. A gasket, according to claim 1, wherein said gasket fastener holes are substantially circular.

4. A gasket, according to claim 3, wherein centers of said gasket fastener holes form a rectangle.

5. A gasket, according to claim 4, wherein said rectangle is substantially square.

6. A fluid connection for connecting a first fluid passage in a first pressure containment structure to a second fluid passage in a second containment structure, said fluid connection comprising:
   (a) a first flange having a first port, said first flange for attachment to such first pressure containment structure so that said first port is in fluid communication with such first fluid passage;
   (b) a second flange having a second port, said second flange for attachment to such second pressure containment structure so that said second port is in fluid communication with such fluid passage;
   (c) a gasket disposed between said first flange and said second flange to seal between said first flange and said second flange, said gasket including:
      (i) a sheet of deformable material enclosed within an outer periphery, said outer periphery defining outwardly extending portions having concave segments between adjacent pairs of said outwardly extending portions;
      (ii) fastener holes formed through said gasket, said fastener holes disposed in said outwardly extending portions of said gasket; and
      (iii) a central opening disposed within an inner periphery of said gasket, said inner periphery of said gasket having a double curvature, in a first instance being curved around said central opening and in a second instance being curved toward said central opening.

7. A fluid connection, according to claim 6, wherein centers of said fastener holes form a regular polygon.

8. A fluid connection, according to claim 7, wherein said gasket is further characterized as having six of said outwardly extending portions, six of said gasket fastener holes, and wherein said outer periphery includes six of said concave portions.

9. A fluid connection, according to claim 8, wherein centers of said gasket fastener holes form a regular hexagon.

10. A fluid connection, according to claim 7, wherein said first port is substantially circular and said second port is substantially circular, said first port having a diameter substantially equal to a diameter of said second port.

11. A fluid connection, according to claim 10, wherein said central opening in said gasket is substantially circular and has a diameter substantially equal to said diameter of said first and said second ports.

12. In combination with a fluid system, the improvement comprising a gasket, said gasket including:
   (a) a sheet of deformable material enclosed within an outer periphery, said outer periphery defining outwardly extending portions having concave segments between adjacent pairs of said outwardly extending portions;
   (b) fastener holes formed through said gasket, said fastener holes disposed in said outwardly extending portions of said gasket; and
   (c) a central opening disposed within an inner periphery of said gasket, said inner periphery of said gasket having a double curvature, in a first instance being curved around said central opening and in a second instance being curved toward said central opening.

13. The combination, according to claim 12, wherein said gasket fastener holes are substantially circular.

14. The combination, according to claim 13, wherein said centers of said gasket fastener holes form a rectangle.

15. The combination, according to claim 14, wherein said rectangle is substantially square.

* * * * *